H. M. ROCKWELL.
DEVICE FOR POSITIONING SPACING MEMBERS.
APPLICATION FILED MAY 1, 1920.
1,419,520.  Patented June 13, 1922.
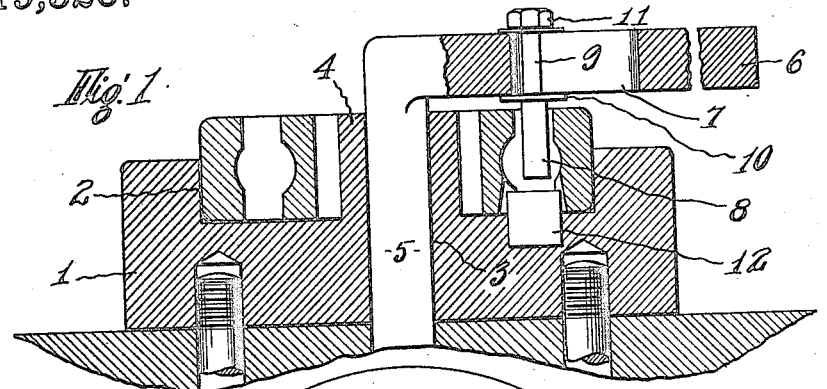
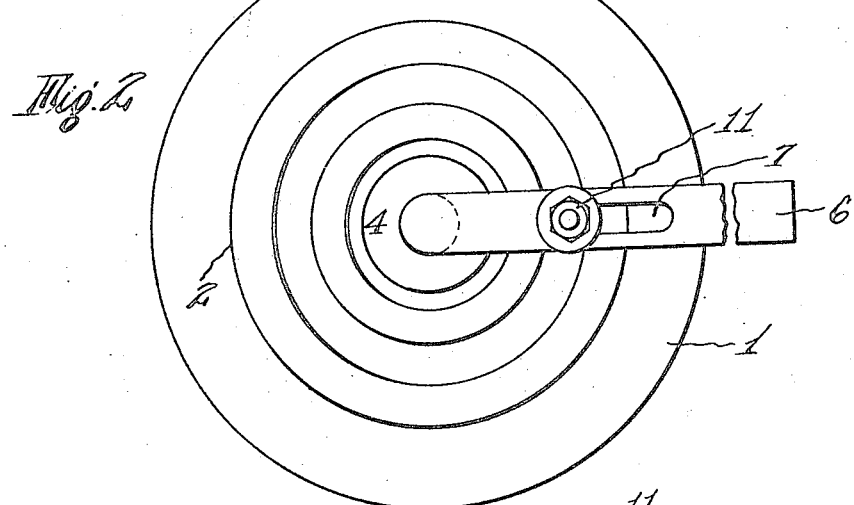
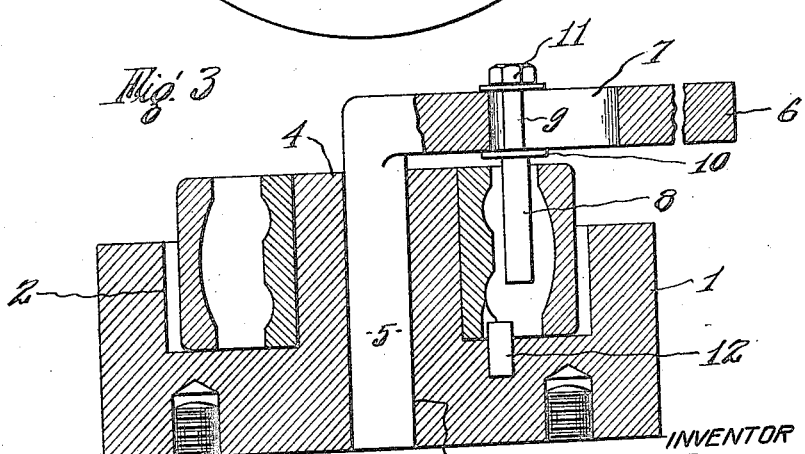
INVENTOR
HUGH M. ROCKWELL.
BY
Edward C. Sassett.
ATTORNEY

UNITED STATES PATENT OFFICE.

HUGH M. ROCKWELL, OF BRISTOL, CONNECTICUT, ASSIGNOR, BY MESNE ASSIGNMENTS, TO STANDARD STEEL AND BEARINGS INCORPORATED, OF WILMINGTON, DELAWARE, A CORPORATION OF DELAWARE.

DEVICE FOR POSITIONING SPACING MEMBERS.

1,419,520.   Specification of Letters Patent.   Patented June 13, 1922.

Application filed May 1, 1920. Serial No. 378,308.

*To all whom it may concern:*

Be it known that I, HUGH M. ROCKWELL, a citizen of the United States, and a resident of Bristol, in the county of Hartford and State of Connecticut, have invented certain new and useful Improvements in Devices for Positioning Spacing Members, of which the following is a specification.

In my copending application, Serial No. 372,898, filed April 10, 1920, I have disclosed an improved method of grinding the faces of the race members of antifriction bearings. In preparing the race members for the grinding operation, resilient spacing members are introduced between said race members to bring them into assembled relation.

This invention relates to a device for use in inserting and removing the spacing members and has for its object the provision of a simple and efficient mechanism for quickly performing these operations.

The invention comprises a bed having a circular socket therein which is adapted to receive the race members of a bearing and is provided with means for preventing the rotation of one or both of the race members. Arranged centrally of the socket is a removable rotatable member carrying a pin or the like adapted to enter between the race members, and by means of which the spacing elements may be moved to the desired position between the race members.

In the drawings,

Fig. 1 is an elevation, partly in section, of the invention;

Fig. 2 is a plan view thereof;

Fig. 3 is an elevation, partly in section, of a modification.

The bed 1 is provided with a preferably annular socket 2. In the recess 3 located in the stud 4, centrally of the socket 2, is removably and rotatably mounted the shaft 5, having the laterally-extending arm 6 in which is cut the slot 7. A pin 8, having the shank 9 extending through the slot 7, is provided with a shoulder 10 which engages the arm 6, and is maintained in any desired position along the slot by means of the nut 11. Arranged in the bottom of the socket 2 is a stop 12 which is adapted to enter the filling notch of one or both of the race members and prevent the rotation thereof.

Either the socket 2 or the stud 4 is of a proper diameter to receive a race member and hold the same against lateral movement relative to the recess 3. The other of these two members is so proportioned as to allow eccentric displacement of a second race member relative to the first race member. The stop 12 is preferably of such a size as to fit into notches in both race members, thus insuring the insertion of each race member into the slot with its notched face downward.

This device is utilized as follows: With the shaft 5 removed, an inner and outer race member are placed in the socket 2, the race members being held against rotary movement by the insertion of the stop 12 into the filling notch of each race member. One of the race members is then arranged eccentric of the other race member and the spacing elements 13 introduced into the space thus provided. The shaft 5 is now inserted in the recess 3 and the pin 8 is engaged with one of the spacing elements. The rotation of the shaft 5 by means of the arm 6 causes a spacer (not shown) to travel along the path formed by the raceways of the two members. In this way the spacing elements are arranged in the position desired, after which the shaft 5 is removed and the race members now in assembled relation are taken from the device and ground. This device is also utilized for removing the spacing elements after the grinding operation, the steps in the removal being simply the reverse of the steps followed in introducing the spacing elements between the race members.

The modification disclosed in Fig. 3 is arranged for use with double-row race members and differs from that disclosed in Figs. 1 and 2 in that the socket 2 is of greater depth and the stop 12 is of less width, as there is a filling notch only in the inner race member.

What I claim is:

1. In a device of the character described, a bed having a socket adapted to receive two annular members of different diameters, means in said socket to retain one of said members against rotation, and means movably carried by said bed adapted to enter between said race members and to move objects from place to place in the space between said members.

2. In a device of the character described, a bed having a socket adapted to receive the race members of an antifriction bearing, means in said socket to retain one of said members against rotation, and means rotatably carried by said bed adapted to traverse the annular space between said race members.

3. In a device of the character described, a bed having a socket adapted to receive the race members of an antifriction bearing, means in said socket to retain one of said members against rotation, a shaft rotatably mounted in said bed, an arm on said shaft, a pin carried by said arm and adapted to traverse the annular space between said race members.

4. In a device of the character described, a bed, means on said bed to receive the race members of an antifriction bearing, the arrangement of said means being such as to allow eccentric displacement of one race member relative to the other race member, and means rotatably carried by said bed adapted to traverse the annular space between said race members.

5. In a device of the character described, a bed, means on said bed to receive the race members of an antifriction bearing, the arrangement of said means being such as to allow eccentric displacement of one race member relative to the other race member, means to prevent rotation of said other race member, and means rotatably carried by said bed adapted to traverse the annular space between said race members.

HUGH M. ROCKWELL.